Aug. 1, 1961

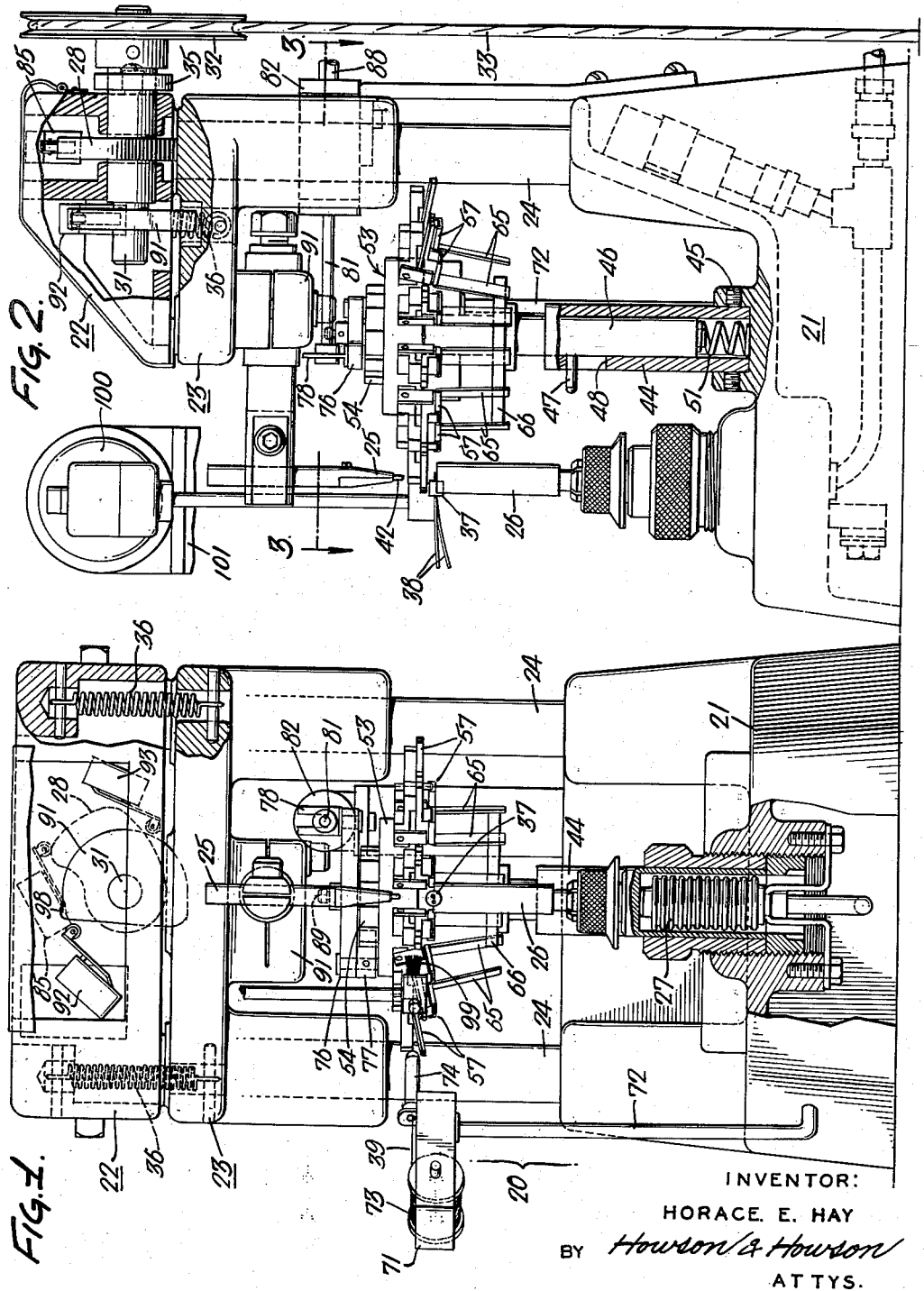

H. E. HAY 2,994,244

BRIDGE WIRE POSITIONING AND WELDING APPARATUS AND METHOD

Filed Jan. 29, 1954

INVENTOR:
HORACE E. HAY
BY Howson & Howson
ATTYS.

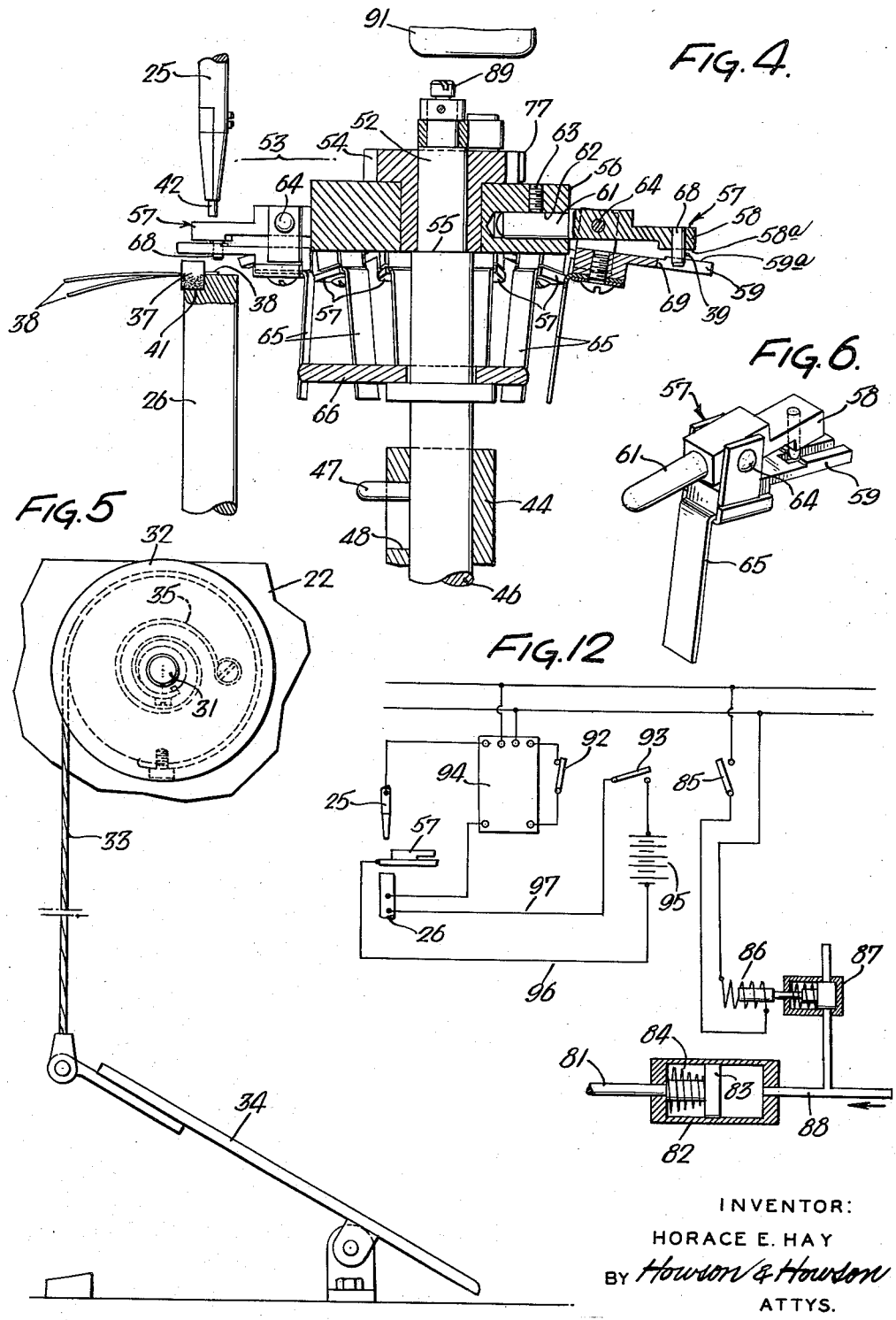

Aug. 1, 1961 H. E. HAY 2,994,244
BRIDGE WIRE POSITIONING AND WELDING APPARATUS AND METHOD
Filed Jan. 29, 1954 4 Sheets-Sheet 4
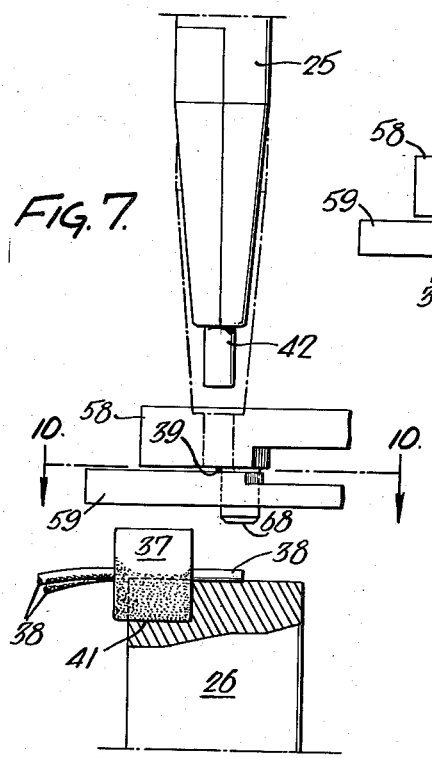
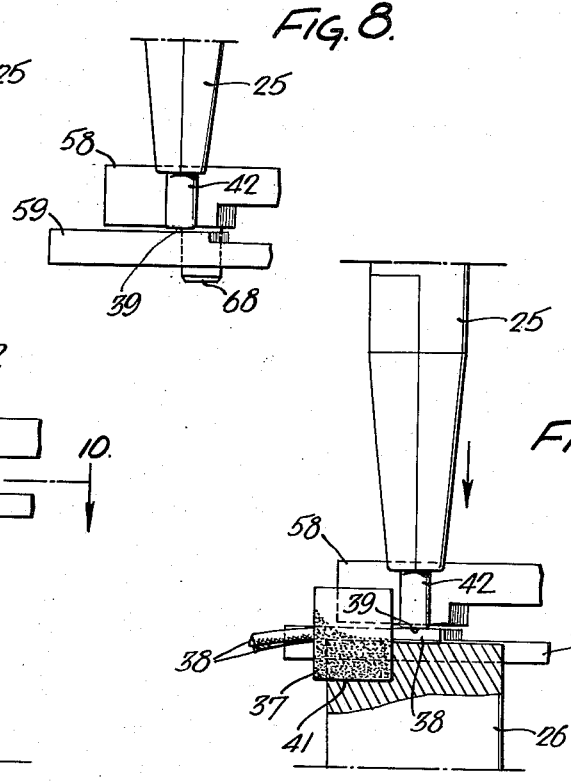
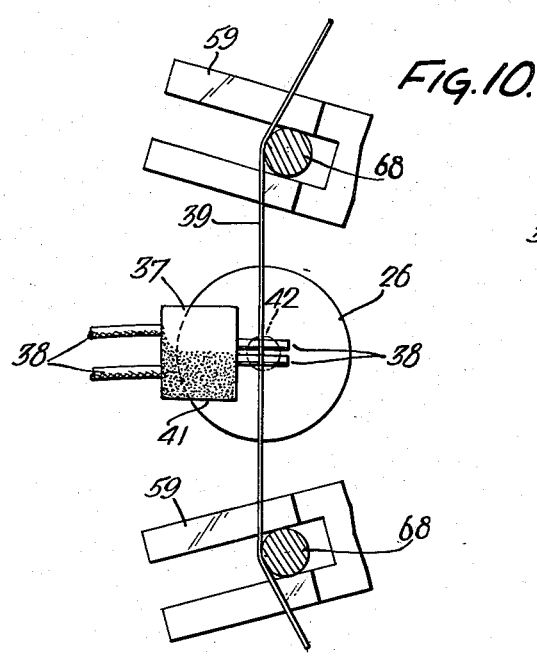
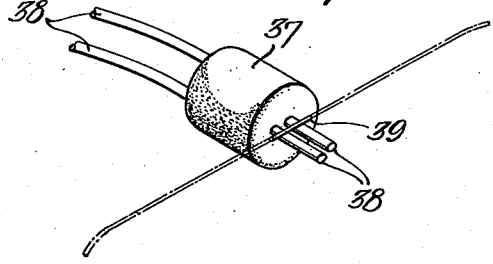
INVENTOR:
HORACE. E. HAY
BY Howson & Howson
ATTYS.

United States Patent Office 2,994,244
Patented Aug. 1, 1961

2,994,244
BRIDGE WIRE POSITIONING AND WELDING APPARATUS AND METHOD

Horace E. Hay, Tamaqua, Pa., assignor to Atlas Powder Company, Wilmington, Del., a corporation of Delaware Filed Jan. 29, 1954, Ser. No. 406,927
24 Claims. (Cl. 86—1)

The present invention relates to new and useful improvements in apparatus and methods for positioning and securing a strand of fine wire between two members. More particularly the present invention relates to novel apparatus and methods for positioning and welding very fine bridge wire for blasting initiators between a pair of spaced-apart leg wires carried by a plug closure which is then inserted into a shell or the like in close proximity with an explosive charge so that passing a current through the bridge wire will explode the blasting initiator.

This invention is directed particularly to the manufacture of very small blasting initiators wherein a bridge wire in the order of 0.0001 inch in diameter is welded or otherwise secured between a pair of closely spaced-apart leg wires. By using a bridge wire of this diameter a relatively small current is required to heat the wire to a sufficient temperature to explode the blasting initiator and also a very short span of bridge wire may be used permitting the leg wires to be positioned close to one another. As a result the overall dimensions of the blasting initiator may be smaller than was heretofore possible. Bridge wire in the neighborhood of 0.0001 inch in diameter is very fragile and a small gust of air will fracture the wire. Accordingly, the present invention also provides positioning means which slowly and carefully moves the wire into position relative to a pair of leg wires for a subsequent welding operation.

With the foregoing in mind a primary object of the present invention is to provide novel apparatus and methods for welding a bridge wire across a pair of closely spaced-apart leg wires in a blasting initiator or similar device.

Another object of the present invention is to provide novel apparatus and methods for intermittently advancing and positioning wire having a diameter of approximately 0.0001 inch without jarring the wire or exerting a force on the wire sufficient to fracture the same.

A further object of the present invention is to provide novel apparatus and methods for placing a bridge wire across a pair of leg wires positioned adjacent the surface of an electrode, bringing a second electrode into engagement with the leg wires and the bridge wire and then completing a circuit through the two electrodes to heat the leg wires and bridge wire to a temperature sufficient to weld the same together.

A further object of the present invention is to provide novel apparatus and methods for removing excess bridge wire from a pair of leg wires after a segment of the bridge wire has been welded across the two leg wires.

A still further object of the present invention is to provide novel apparatus and methods for positioning and securing a strand of fine wire between two members, having the features and characteristics set forth above which is of relatively simple construction and operation and entirely efficient and effective in use.

These and other objects of the present invention and the various features and details of the operation and construction thereof are hereinafter more fully set forth and described with reference to the accompanying drawings, in which:

FIG. 1 is a front elevational view partially in section of a welding unit made in accordance with the present invention;

FIG. 2 is a side elevational view partially in section of the welding unit illustrated in FIG. 1;

FIG. 4 is a longitudinal sectional view taken on line 4—4, FIG. 3 illustrating the construction of the bridge wire advancing mechanism;

FIG. 5 is a fragmentary rear elevational view of the foot treadle and cam operating means for raising and lowering the welding head;

FIG. 6 is a perspective view of one of the arms of the spider which engages and grips the bridge wire;

FIG. 7 is an enlarged side elevational view of the upper and lower welding electrodes in their position at the start of the welding operation;

FIG. 8 is a fragmentary view similar to FIG. 7 illustrating the upper welding electrode in its downward position with respect to the spider;

FIG. 9 is a view similar to FIG. 7 illustrating the spider and the upper electrode in an advanced position adjacent the lower electrode immediately prior to the welding operation;

FIG. 10 is a fragmentary plan view of the lower electrode and spider arms which position the bridge wire relative to the plug closure and leg wires supported by the lower electrode;

FIG. 11 is an enlarged perspective view of a preformed plug closure having leg wires extending therethrough and a bridge wire welded across the two leg wires; and FIG. 12 is a schematic wiring diagram of the operating mechanism for the welding unit of the present invention.

Figure 3:
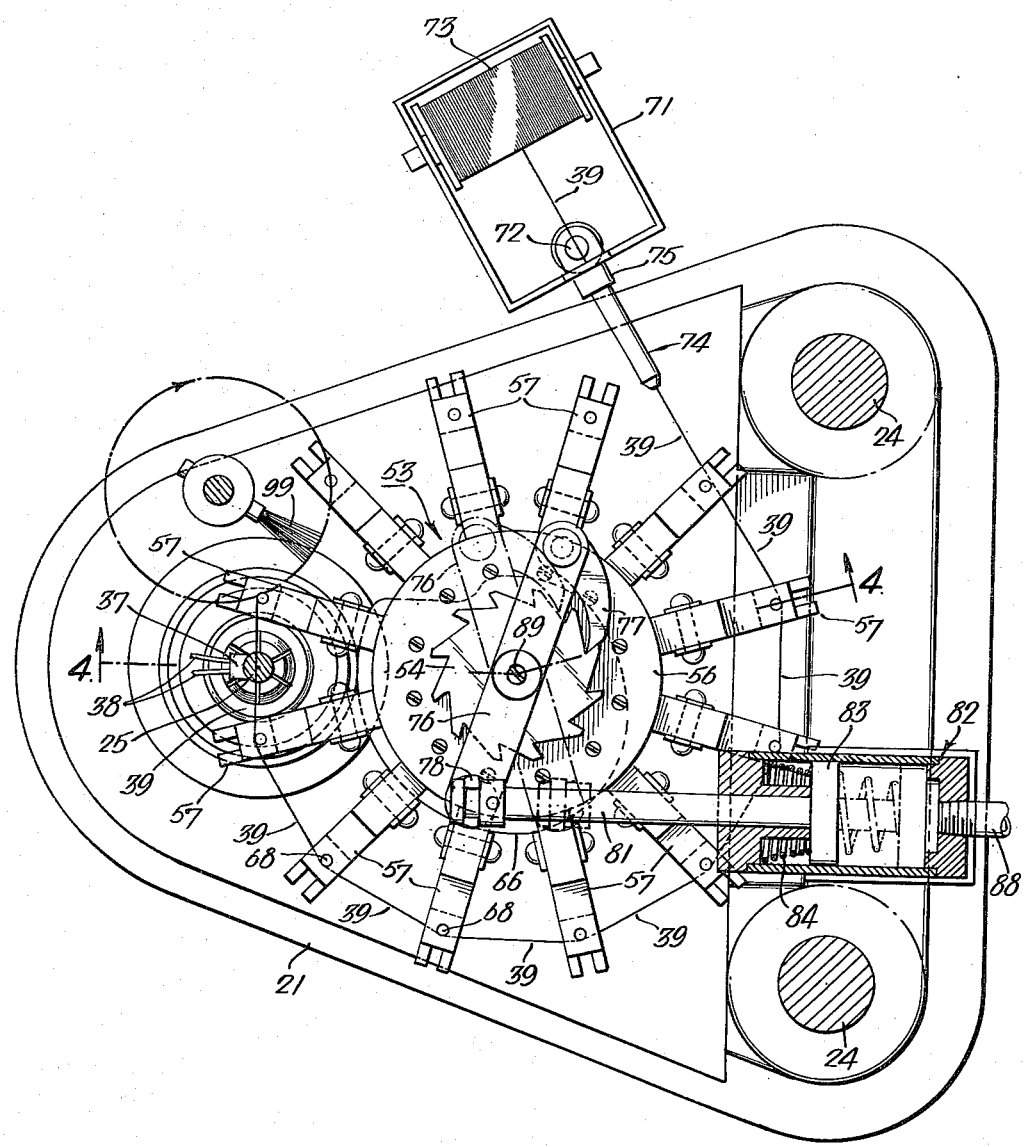
FIG. 3 is an enlarged transverse sectional view taken on line 3—3 of FIG. 2 illustrating the mechanism for advancing the bridge wire intermittently to the welding position.

Referring more specifically to the drawings and particularly FIGS. 1 and 2 thereof, reference numeral 20 designates generally a welding unit comprising a base 21, a stationary head 22 and a movable head 23. The movable head 23 is slidably mounted on a pair of vertical guide rods 24, 24 intermediate the base and stationary head for relative vertical movement between upper and lower limit positions. Upper and lower electrodes 25 and 26, respectively, are carried by the movable head and base, respectively, and during the operation of the welding unit the upper electrode 25 is lowered against the work resting on the lower electrode 26. This, in turn, forces the lower electrode downward against pressure exerted by a bellows 27 containing air under pressure so that a predetermined amount of constant pressure is applied to the work. An electric circuit is then completed through the two electrodes to weld the work and the upper electrode is elevated to permit a new work piece to be placed on the lower electrode. This welding unit as described above is of conventional construction and, for example, may be similar to the Model "G" welding unit manufactured and sold by the Raytheon Manufacturing Company of Waltham, Massachusetts.

To actuate the movable head 23 to its lower limit position a cam 28 is mounted on a shaft 31 rotatably supported by the stationary head 22. The shaft 31 projects rearwardly of the welding unit and carries a sheave 32. As shown in FIG. 5, a cable 33 passes over the sheave 32 and has one end thereof secured to the periphery of the sheave and the other end secured to a foot treadle 34. Forcing the foot treadle 34 downwardly rotates the sheave 32, shaft 31 and cam 28 causing the peripheral surface of the cam 28 to engage the upper surface of the movable head 23 and force the same downwardly. A torsion spring 35 interconnects the stationary head and the sheave to return the cam 28 to its original position upon release of the foot treadle while a pair of tension springs 36, 36 interconnecting the stationary head 22 and the movable head 23 resiliently urge the movable head to its upper limit position.

In accordance with the present invention a preformed plug closure 37 having a pair of spaced-apart leg wires 38, 38 extending therethrough is positioned on the lower electrode 26 with the leg wires which project from the base of the plug closure in engagement with and parallel to the upper surface of the electrode 26. A bridge wire 39 having a diameter of approximately 0.0001 inch is positioned across the two leg wires above the upper surface of the electrode 26 and the upper electrode 25 is lowered into engagement with the leg wires and the bridge wire 39. A circuit is then completed between the two electrodes heating the leg wires to a sufficient temperature to weld the leg wires and bridge wire together. The lower electrode has a semi-cylindrical recess 41 adjacent the forward edge of its upper surface to receive the plug and properly position the leg wires while the upper electrode has a cylindrical tip portion 42 at the lower edge thereof to engage the leg wires and the bridge wire.

An important feature of the present invention is the provision of means to intermittently advance the bridge wire to present a new segment of the bridge wire above the lower electrode after each welding operation. To this end, a hollow cylindrical sleeve 44 is secured in a vertical position to the welding unit base, for example as indicated at 45 in FIG. 2, immediately behind the bellows 27 and lower electrode 26 in spaced parallel relation therewith. The cylindrical sleeve 44 telescopically receives a rod 46 which is mounted therein in a vertical position for movement between upper and lower limit positions. The limit positions of the rod 46 are determined by a pin 47 projecting outwardly from one side of the rod 46 through a slotted opening 48 in the sleeve 44. A spiral compression spring 51 positioned in the lower portion of the cylindrical sleeve 44 in engagement with the rod 46 resiliently urges the rod 46 to its upper limit position wherein the pin 47 engages the upper end of the slot 48. Pressure exerted against the upper end of the rod 46 will force the same downwardly in the sleeve 44 against the pressure of the spring 51 to the lower limit position thereof.

With reference to FIGS. 3, 4 and 6, the rod 46 is provided with a reduced upper end portion 52 which rotatably mounts a spider assembly 53. The spider assembly 53 comprises a ratchet wheel 54 rotatably carried by the upper end 52 of the rod 46 in engagement with a shoulder 55 at the junction between the upper and lower portions of the rod 46. A spider hub 56 is fixedly secured to the ratchet wheel 54 as shown in FIG. 4 and has a series of jaws 57 extending radially outward from the peripheral surface thereof. The jaws are uniformly spaced about the periphery of the spider hub and receive and carry the bridge wire 39.

Each jaw assembly 57 consists of an upper stationary jaw plate 58 and a lower swinging jaw plate 59. The upper jaw plates 58 have a supporting pin 61 extending outwardly from the rear surface thereof which are received in radial openings 62 in the spider hub 56. A set screw 63 maintains the pin 61 in the opening 62 and permits relative radial adjustment of each jaw assembly 57 relative to the spider hub 56. The lower jaw plate 59 is pivotally secured to the inner end of the upper jaw plate 58 adjacent the pin 61, for example as indicated at 64, and is free to swing downwardly away from the upper jaw plate 58 as shown in full lines on the right-hand side of FIG. 4.

A resilient leaf spring 65 extends downwardly from the inner edge of the lower jaw plate 59 adjacent a cam 66 fixedly secured to the rod 46. The cam 66 is operable to engage and force the lower portion of the leaf spring 65 radially outward away from the rod 46 which, in turn, pivots the lower jaw plate 59 upwardly into engagement with the upper paw plate 58. The upper and lower jaw plates are provided with cooperating gripping surfaces 58a and 59a, respectively, which are engaged flat against one another when the leaf spring 65 is forced radially outward as previously described to securely grip a bridge wire or the like which may be positioned between these gripping surfaces. A pin 68 carried by the upper jaw plate and projecting downwardly through a slot 69 in the lower jaw plate positions the bridge wire in the proper relation relative to the jaw assembly 57. The cam 66 is formed, for example, as shown in FIG. 3 so that the lower jaw 59 of each jaw assembly is permitted to drop to a lowered position to receive the bridge wire. Upon rotation of the spider relative to the cam, the jaws are gradually closed to tightly grip the bridge wire and hold the same in position over the lower electrode.

In accordance with the present invention the bridge wire is directed tangentially toward the spider assembly 53 to a position adjacent the pin 68 and intermediate the gripping surfaces of the upper and lower jaw plates. The spider is then rotated intermittently to carry the bridge wire around the periphery of the spider into a position above the lower electrode 26. To direct the wire to the spider assembly a spool mount 71 is supported on a rod 72 extending upwardly from the base of the welding unit as illustrated in FIG. 1 and rotatably mounts a spool 73 carrying the bridge wire 39. A cylindrical guide member 74 is carried by the forward end of the spool mount 71 and the entire spool mount is pivotally mounted on the upper end of the rod 72, for example as indicated at 75. The bridge wire is directed through the spool guide 74 toward the spider assembly 53. By this construction the wire 39 may be drawn from the spool 73 with a force smaller than that required to break the bridge wire 39.

As set forth above, the spider is rotated intermittently to advance the bridge wire 39 around the periphery of the spider to a position wherein the segment of the wire between two adjacent jaw assemblies 57, 57 is immediately above the lower electrode 26. To accomplish this, a rocker arm 76 is pivotally mounted at its mid-point to the upper end of the rod 46 immediately above the ratchet wheel 54 and carries at one end thereof a pawl 77 which is resiliently urged into engagement with the teeth of the ratchet wheel 54. Pivotally secured to the opposite end of the rocker arm 76 is a yoke 78 which is secured to the piston rod 81 of a hydraulic cylinder 82. Forcing the piston 83 of the hydraulic cylinder 82 to its forward limit position in the cylinder will pivot the rocker arm 76 in a clockwise direction with respect to FIG. 3 causing the pawl 77 to engage against a tooth of the ratchet wheel 54 and rotate the entire spider assembly 53 in the clockwise direction. Rearward movement of the piston 83 and piston rod 81 will pivot the rocker arm 76 counterclockwise with respect to FIG. 3 to the position shown therein in broken lines, wherein the pawl 77 passes over one tooth of the sprocket wheel 54. The ratchet wheel 54 is provided with a number of teeth equal to the number of jaws 57 on the spider assembly so that one cycle of operation of the hydraulic cylinder 82 will cause any one jaw assembly to pass from a position on one side of the stationary electrode 26 to a position adjacent the opposite side of the electrode 26 and thus presenting the next adjacent segment of bridge wire 39 to the electrode 26.

The piston 83 in the hydraulic cylinder 82 is forced to its forward position by admitting fluid under pressure to the rear face of the piston 83. When the pressure is released from the rear face of the piston, the piston is moved to its rearward position by means of a compression spring 84 positioned interiorly of the hydraulic cylinder 82 in engagement with the forward face of the piston 83.

At the start of the operation of one welding cycle the various parts of the welding unit are in the position shown in full lines in FIGS. 1 and 2. The bridge wire 39 is positioned about the periphery of the spider assembly 53 in engagement with the jaws from the point of initial engagement of the wire with the jaws to a position over the lower electrode as shown in FIG. 3. The plug closure 37 is then positioned in the recess 41 on the electrode 26 with the leg wires 38 extending toward the center of the electrode 26 and lying flat on the upper surface thereof. The operator of the machine then pushes the foot treadle 34 downwardly causing rotation of the shaft 31 and cam 28.

During the initial portion of rotation of the cam 28 a switch 85 is disengaged from contact with the peripheral surface of the cam 28. The switch 85 is normally closed and maintained in the open position by engagement with the cam 28. Closing the switch 85 causes energization of a solenoid 86 which, in turn, controls the operation of a relief valve 87. The relief valve is tapped into the line 88 conducting hydraulic fluid under pressure to the hydraulic cylinder 82, for example as shown in the schematic wiring and control diagram in FIG. 12. Pressure is normally maintained in the line leading to the hydraulic cylinder 82 and when the relief valve 87 is actuated to its open position by energization of the solenoid 86, pressure is relieved from the rear surface of the piston 83 thereby permitting the compression spring 84 to force the piston 83 to its rearward limit position. By this construction the initial downward movement of the foot treadle will cause the rocker arm 76 to be moved from the full line position to the broken line position as shown in FIG. 3.

Further rotation of the cam 28 due to the downward movement of the foot treadle 34 causes the cam 28 to engage the upper surface of the movable head 23 and force the movable head toward its lower limit position. During downward movement of the movable head 23 a bolt 89 threaded into the upper end of the rod 46 is engaged by the lower surface 91 of the movable head 23 and after engagement of the bolt further downward movement of the movable head 23 forces the rod 46 and the spider assembly 53 downwardly along with the head 23. The position of the bolt 89 with respect to the rod 46 is adjusted for engagement by the movable head immediately after the lowermost surface of the tip of the upper electrode 25 engages the strand of bridge wire 39, for example as shown in the broken line position in FIG. 7 and in full lines in FIG. 8, so that the bridge wire is displaced slightly downwardly from its normal position by the upper electrode. During further rotation of the cam 28 the upper electrode and the spider assembly move together in the relation shown in FIG. 8 and the bridge wire is compressed between the lowermost tip of the electrode and the upper surface of the leg wires positioned on the lower electrode to cause the lower tip of the upper electrode to engage the leg wires.

The movable head of the welding unit continues down past this position causing the upper electrode to exert pressure on the leg wires and force the lower electrode down to the position shown in FIG. 9 against the pressure of the bellows 27 to thereby obtain a predetermined amount of pressure on the leg wires and bridge wire.

Fixedly secured to the shaft 31, which is rotated during downward movement of the foot treadle, is a second cam 91 operable to actuate a pair of switches 92 and 93. After the movable welding head has been actuated to its lower most limit position by the cam 28 and the predetermined welding pressure has been obtained, the cam 91 engages and actuates the normally closed switch 92 to the open position. Actuating the switch 92 to this open position momentarily completes a welding circuit through the upper and lower electrodes 25 and 26. The welding circuit is completed from a conventional welding control unit 94 which, for example, may discharge a capacitor when the switch 92 is opened. The surge of electric current through the leg wires and bridge wire will heat the same and cause the leg wires and bridge wire to be welded together.

In accordance with the present invention means are provided to burn away the excess bridge wire immediately adjacent the outer edges of the pair of leg wires. This is accomplished by passing an electric current through the bridge wire after the bridge wire has been welded to the leg wires. The electric current is great enough to burn the bridge wire and thus remove the excess bridge wire from the leg wires. This current is passed through the bridge wire immediately after the welding operation and while the bridge wire is still heated from the weld so that the point of greatest resistance to the electric current in the bridge wire is immediately adjacent the leg wires. This is true as the resistance of the bridge wire increases when the bridge wire is heated and the hottest portion of the bridge wire will be at the point adjacent the weld.

The circuit to the bridge wire is completed from any suitable electric source such as, for example, a battery 95 through a lead wire 96 electrically connected to the spider assembly 53. The electric current then passes through the bridge wire from the two jaws of the spider adjacent opposite sides of the lower electrode 26 through the bridge wire to the leg wires and from there through the lower electrode 26, lead wire 97 connected to the lower electrode, the switch 93 and then back to the battery 95. The switch 93 is normally opened and is adapted to be engaged by a radial projection 98 formed on the surface of the cam 91. The projection 98 of the cam 91 engages and actuates the switch 93 to its closed position a fraction of a second after the switch 92 is actuated so that the electric current passes through the bridge wire while the bridge wire is still heated due to the welding operation.

After the welding operation is completed the operator of the machine permits the foot treadle 34 to be elevated thereby causing rotation of the cam 28 in the opposite direction permitting the springs 36 to pull the movable welding head 23 upwardly. As the cam 28 reaches its initial start position it engages and opens the normally closed switch 85 thus de-energizing the solenoid 86 thereby permitting the relief valve 87 to be closed. Pressure is then exerted on the rearward face of the piston 83 in the hydraulic cylinder 82 forcing the same to its forward limit position. This in turn causes clockwise rotation of the rocker arm 76 with respect to FIG. 3 rotating the spider assembly 53 and presenting the next adjacent segment of bridge wire carried by the jaws 57 to the lower electrode 26. This completes one cycle of operation of the welding unit of the present invention and an operator may now remove the plug closure from the lower electrode, position a second plug closure on the lower electrode and repeat the above described operation.

As the jaws 57 of the spider 53 are advanced past the position where they support a segment of bridge wire over the lower electrode, the leaf springs 65 carried by the lower jaw plates 59 are disengaged from the cam 66 permitting the jaws to be opened to receive the bridge wire. Any small pieces of bridge wire remaining in the jaws after the welding operation are automatically removed therefrom, for example, by means of a continuously rotating brush 99 mounted adjacent the path of travel of the jaws 57 as shown in FIGS. 2 and 3. The brush 99 is driven, for example, by means of an electric motor 100 supported by a frame 101 adjacent the stationary head of the welding unit. If desired an air blast or any other suitable means may be provided in place of a rotary brush to remove the excess pieces of bridge wire from the jaws 57.

From the foregoing it is apparent that the present invention provides novel apparatus and methods for welding a bridge wire across a pair of closely spaced-apart leg wires in a blasting initiator or similar device. In addition, the present invention provides novel apparatus and methods for intermittently advancing and positioning very fine wire across a pair of leg wires without jarring the wire or exerting a sufficient force on the wire to fracture the same, and then bringing a second electrode in engagement with the leg wires and the bridge wire to heat the leg wires and bridge wire to a sufficient temperature to weld the same together.

While certain embodiments of the present invention have been illustrated and described herein, it is not intended to limit the invention to such a disclosure and changes and modifications may be incorporated and embodied therein within the scope of the following claims:

I claim:

1. Apparatus for positioning and securing a strand of fine wire between two members comprising; wire advancing mechanism operable to grip the wire and advance the wire intermittently, means to feed the wire to said wire advancing mechanism, drive means in engagement with the wire advancing mechanism operable to actuate the same, a pair of electrodes mounted at opposite sides of the wire carried by said advancing mechanism with both the electrodes spaced from the wire, one of said electrodes operable to receive the members between which said wire is secured, and means to cause movement of one of said electrodes relative to the other electrode and the wire to engage the wire and thereafter cause movement of the wire relative to the other electrode to position said wire in engagement with said members and cause the electrodes to engage said members and said wire.

2. Apparatus for positioning and securing a strand of fine wire between two members comprising; wire advancing mechanism operable to grip the wire and advance the wire intermittently, means to feed the wire to said wire advancing mechanism, drive means in engagement with the wire advancing mechanism operable to actuate the same, a pair of electrodes mounted at opposite sides of the wire carried by said advancing mechanism with both electrodes spaced from the wire, one of said electrodes operable to receive the members between which said wire is secured, means to cause movement of one of said electrodes relative to the other electrode and the wire to engage the wire and thereafter cause movement of the wire relative to the other electrode to position said wire in engagement with said members and cause the electrodes to engage said members and said wire, a welding circuit, and means to complete said welding circuit after both of said electrodes are in engagement with said members to thereby weld the wire to said members.

3. Apparatus for positioning and securing a strand of fine wire between two members comprising; wire advancing mechanism operable to grip the wire and advance the wire intermittently, means to feed the wire to said wire advancing mechanism, drive means in engagement with the wire advancing mechanism operable to actuate the same and advance the wire intermittently, a pair of electrodes mounted in axial alinement at opposite sides of the wire carried by said advancing mechanism with both electrodes spaced from the wire, one of said electrodes operable to receive the members between which said wire is secured, means to cause relative movement of said electrodes with respect to each other and to said wire to position said wire in engagement with said members and cause the electrodes to engage said members and said wire, a welding circuit, means to complete said welding circuit after said electrodes are in engagement with said members and said wire to thereby weld the wire to said members, a second electric circuit including the members, wire advancing mechanism, and the wire between the members and advancing mechanism operable to burn excess wire from said members, and means to complete said circuit after the welding operation.

4. Apparatus for positioning and securing a strand of fine wire between two members comprising; wire advancing mechanism operable to grip the wire and advance the wire intermittently, means to feed the wire to said wire advancing mechanism, drive means in engagement with the wire advancing mechanism operable to actuate the same and advance the wire intermittently, a pair of electrodes mounted in axial alignment at opposite sides of the wire carried by said advancing mechanism with both electrodes spaced from the wire, one of said electrodes operable to receive the members between which said wire is secured, means to cause relative movement of said electrodes with respect to each other and to said wire to position said wire in engagement with said members and cause the electrodes to engage said members and said wire, a welding circuit, means to complete said welding circuit after both of said electrodes are in engagement with said members to thereby weld the wire to said members, and control means actuatable after completion of said welding circuit to actuate said drive means and position the next adjacent segment of the wire intermediate said electrodes.

5. Apparatus for positioning and securing a strand of fine wire between two members comprising; a spider assembly mounted for rotary movement, a plurality of gripping jaws carried by said spider assembly extending radially outwardly therefrom at regular spaced intervals, means to feed wire to said spider assembly and between the gripping jaws thereof, drive means to rotate said spider assembly intermittently to thereby intermittently advance said wire, a pair of electrodes mounted adjacent opposite sides of the wire carried by said spider assembly and spaced from the wire, one of said electrodes operable to receive said members, and means to cause relative movement of said electrodes with respect to each other and to said wire to position the wire in engagement with said members and cause said electrodes to engage opposite sides of said members and said wire to thereby weld said wire to said members.

6. Apparatus for positioning and securing a strand of fine wire between two members comprising; a spider assembly mounted for rotary movement, a plurality of gripping jaws carried by said spider assembly extending radially outwardly therefrom at regular spaced intervals, means to feed wire to said spider assembly and between the gripping jaws thereof, drive means to rotate said spider assembly intermittently to thereby intermittently advance said wire, a pair of electrodes mounted at opposite sides of the wire carried by said spider assembly and spaced from the wire, one of said electrodes operable to receive said members, means to cause relative movement of said electrodes with respect to each other and to said wire to position the wire in engagement with said members and cause said electrodes to engage opposite sides of said members and said wire to thereby weld said wire to said members, and control means operable to cause relative movement of said electrodes away from one another and thereafter actuate said drive means to rotate said spider and position the next adjacent segment of wire carried by the spider intermediate said electrodes.

7. Apparatus for positioning and securing a strand of fine wire between two members comprising; a spindle, a spider assembly rotatably mounted on said spindle, a plurality of gripping jaws carried by said spider assembly extending radially outward therefrom at regular spaced intervals, said gripping jaws being normally opened to receive said wire, means to feed wire to said spider assembly between said gripping jaws, a cam fixedly secured to said spindle, resilient means carried by said gripping jaws operable upon engagement with said cam to close said gripping jaws and cause the same to securely grip the wire, drive means in engagement with said spider assembly operable to intermittently rotate the same to position said resilient means into engagement with said cam and close the gripping jaws, a pair of electrodes mounted adjacent opposite sides of the wire carried by said spider assembly, one of said electrodes operable to receive said members, and means to cause relative movement of said electrodes with respect to each other and to said wire to position the wire in engagement with said members and cause said electrodes to engage opposite sides of said members and said wire to thereby weld said wire to said members.

8. Apparatus for positioning and securing a strand of fine wire between two members comprising; a spindle, a spider assembly rotatably mounted on said spindle, a plurality of gripping jaws carried by said spider assembly extending radially outward therefrom at regular spaced intervals, said gripping jaws being normally opened to receive said wire, means to feed wire to said spider assembly between said gripping jaws, a cam fixedly secured to said spindle, resilient means carried by said gripping jaws operable upon engagement with said cam to close said gripping jaws and cause the same to securely grip the wire, a ratchet rotatably mounted on said spindle secured to said spider assembly, a pawl in engagement with said ratchet actuatable between predetermined limit positions, said pawl operable during movement toward one of said limit positions to ratchet over said ratchet and during movement toward the other limit position to engage said ratchet and rotate said spider assembly, means to actuate said pawl between said limit positions, a pair of electrodes mounted adjacent opposite sides of the wire carried by said spider assembly, one of said electrodes being operable to receive said members, and means to cause relative movement of said electrodes with respect to each other and to said wire to position the wire in engagement with said members and cause said electrodes to engage opposite sides of said members adjacent said wire to thereby weld said wire to said members.

9. Apparatus for positioning and securing a strand of fine wire between two members comprising; a spindle, a spider assembly rotatably mounted on said spindle, a plurality of gripping jaws carried by said spider assembly extending radially outward therefrom at regular spaced intervals, said gripping jaws being normally opened to receive said wire, means to feed wire to said spider assembly between said gripping jaws, a cam fixedly secured to said spindle, resilient means carried by said gripping jaws operable upon engagement with said cam to close said gripping jaws and cause the same to securely grip the wire, a ratchet rotatably mounted on said spindle secured to said spider assembly, a pawl in engagement with said ratchet actuatable between predetermined limit positions, said pawl operable during movement toward one of said limit positions to ratchet over said ratchet and during movement toward the other limit position to engage said ratchet and rotate said spider assembly, means to actuate said pawl between said limit positions, a pair of electrodes mounted adjacent opposite sides of the wire carried by said spider assembly, one of said electrodes being operable to receive said members, means to cause relative movement of said electrodes with respect to each other and to said wire to position the wire in engagement with said members and cause said electrodes to engage opposite sides of said members adjacent said wire to thereby weld said wire to said members, and control means operable to cause relative movement of said electrodes away from one another and thereafter actuate the means for actuating said pawl to intermittently rotate said spider assembly and position the next adjacent segment of wire intermediate said electrodes.

10. Apparatus for positioning and securing a strand of fine wire between two members comprising; a spider assembly mounted for rotary movement, a plurality of gripping jaws carried by said spider assembly extending radially outwardly therefrom at regular spaced intervals, means to feed wire to said spider assembly and between the gripping jaws thereof, drive means to rotate said spider assembly intermittently to thereby intermittently advance said wire, a pair of electrodes mounted adjacent opposite sides of the wire carried by said spider assemblies, one of said electrodes being operable to receive said members, means to cause relative movement of said electrodes with respect to each other and to said wire to position the wire in engagement with said members and cause said electrodes to engage opposite sides of said members adjacent said wire, a welding circuit, switch means in said circuit operable to be actuated and complete said circuit after the electrodes are brought into engagement with said members to thereby weld the wire to said members, and control means operable to cause relative movement of said electrodes away from one another and thereafter actuate said drive means to rotate said spider and position the next adjacent segment of wire carried by the spider intermediate said electrodes.

11. Apparatus for positioning and securing a strand of fine wire between two members comprising; a spider assembly mounted for rotary movement, a plurality of gripping jaws carried by said spider assembly extending radially outwardly therefrom at regular spaced intervals, means to feed wire to said spider assembly and between the gripping jaws thereof, drive means to rotate said spider assembly intermittently to thereby intermittently advance said wire, a pair of electrodes mounted adjacent opposite sides of the wire carried by said spider assemblies, one of said electrodes being operable to receive said members, means to cause relative movement of said electrodes with respect to each other and to said wire to position the wire in engagement with said members and cause said electrodes to engage opposite sides of said members adjacent said wire, a welding circuit, switch means in said circuit operable to be actuated and complete said circuit after the electrodes are brought into engagement with said members to thereby weld the wire to said members, a second electric circuit including the members, the spider, and the wire between said members and spider, second switch means operable to be actuated and complete said circuit after actuation of said first switch means to burn excess wire from said members, and control means operable to cause relative movement of said electrodes away from one another and thereby actuate said drive means to rotate said spider and position the next adjacent segment of wire carried by the spider intermediate said electrodes.

12. Apparatus for positioning and securing a strand of fine wire between two members comprising; wire advancing mechanism operable to grip the wire and advance the wire intermittently, means to feed the wire to said wire advancing mechanism, drive means in engagement with the wire advancing mechanism operable to actuate the same and advance the wire intermittently, a lower electrode on which the members are placed positioned beneath the path of travel of the wire carried by said wire advancing mechanism, an upper electrode above said wires in axial alignment with said lower electrode, said upper and lower electrodes being spaced a predetermined distance from the wire, a head supporting said upper electrode and mounted for relative vertical movement with respect to said lower electrode between upper and lower limit positions, and drive means operable to actuate said head to its lower limit position wherein said upper electrode engages the upper surface of the members carried by said lower electrode adjacent said wire to thereby weld the wire to said members, said drive means being operable during downward movement of said head to actuate said wire downwardly into engagement with said members.

13. Apparatus for positioning and securing a strand of fine wire between two members comprising; wire advancing mechanism operable to grip the wire and advance the wire intermittently, means mounting said wire advancing mechanism for relative vertical movement, means to feed the wire to said wire advancing mechanism, drive means in engagement with the wire advancing mechanism operable to actuate the same and advance the wire intermittently, a lower electrode on which the members are placed positioned beneath the path of travel of the wire carried by said wire advancing mechanism, an upper electrode above said wires in axial alignment with said lower electrode, a head supporting said upper electrode and mounted for relative vertical movement with respect to said lower electrode between upper and lower limit positions, and drive means operable to actuate said head to its lower limit position into engagement with said wire advancing mechanism to force said wire advancing mechanism downwardly and position the wire carried thereby against said members, said drive means actuatable during said downward movement of the head to position said upper electrode in engagement with said members carried by the lower electrode adjacent said wire to thereby weld the wire to said members.

14. Apparatus for positioning and securing a strand of fine wire between two members comprising; wire advancing mechanism operable to grip the wire and advance the wire intermittently, means mounting said wire advancing mechanism for relative vertical movement, means to feed the wire to said wire advancing mechanism, drive means in engagement with the wire advancing mechanism operable to actuate the same and advance the wire intermittently, a lower electrode on which the members are placed positioned beneath the path of travel of the wire carried by said wire advancing mechanism, an upper electrode above said wires in axial alignment with said lower electrode, a head supporting said upper electrode and mounted for relative vertical movement with respect to said lower electrode between upper and lower limit positions, drive means operable to actuate said head to its lower limit position into engagement with said wire advancing mechanism to force said wire advancing mechanism downwardly and position the wire carried thereby against said members, said drive means actuatable during said downward movement of the head to position said upper electrode in engagement with said members carried by the lower electrode adjacent said wire to thereby weld the wire to said members, and adjustable stop means carried by said wire advancing mechanism operable to be engaged by said head when the lowermost edge of the upper electrode engages the wire to thereby cause downward movement of the wire advancing mechanism with the head when the upper electrode is adjacent the wire.

15. Apparatus for positioning and securing a strand of fine wire between two members comprising; wire advancing mechanism operable to grip the wire and advance the wire intermittently, means mounting said wire advancing mechanism for relative vertical movement, means to feed the wire to said wire advancing mechanism, drive means in engagement with the wire advancing mechanism operable to actuate the same and advance the wire intermittently, a lower electrode on which the members are placed positioned beneath the path of travel of the wire carried by said wire advancing mechanism, an upper electrode above said wires in axial alignment with said lower electrode, a head supporting said upper electrode and mounted for relative vertical movement with respect to said lower electrode between upper and lower limit positions, drive means operable to actuate said head to its lower limit position into engagement with said wire advancing mechanism to force said wire advancing mechanism downwardly and position the wire carried thereby against said members, said drive means actuatable during said downward movement of the head to position said upper electrode in engagement with said members carried by the lower electrode adjacent said wire, adjustable stop means carried by said wire advancing mechanism operable to be engaged by said head when the lowermost edge of the upper electrode engages said wire, a welding circuit, and switch means in said circuit operable to be actuated and complete said circuit after said upper electrode engages said members to thereby weld the wire to said members.

16. Apparatus for positioning and securing a strand of fine wire between two members comprising; wire advancing mechanism operable to grip the wire and advance the wire intermittently, means mounting said wire advancing mechanism for relative vertical movement, means to feed the wire to said wire advancing mechanism, drive means in engagement with the wire advancing mechanism operable to actuate the same and advance the wire intermittently, a lower electrode on which the members are placed positioned beneath the path of travel of the wire carried by said wire advancing mechanism, an upper electrode above said wires in axial alignment with said lower electrode, a head supporting said upper electrode and mounted for relative vertical movement with respect to said lower electrode between upper and lower limit positions, drive means operable to actuate said head to its lower limit position into engagement with said wire advancing mechanism to force said wire advancing mechanism downwardly and position the wire carried thereby against said members, said drive means actuatable during said downward movement of the head to position said upper electrode in engagement with said members carried by the lower electrode adjacent said wire, adjustable stop means carried by said wire advancing mechanism operable to be engaged by said head when the lowermost edge of the upper electrode engages the wire, a welding circuit, switch means in said circuit operable to be actuated and complete said circuit after said upper electrode engages said members to thereby weld the wire to said members, a second electric circuit including the members, the wire advancing mechanism, and the wire between said members and wire advancing mechanism, and second switch means operable to be actuated and complete said second circuit after the welding operation to burn excess wire from said members.

17. Apparatus for positioning and securing a strand of fine wire between two members comprising; wire advancing mechanism operable to grip the wire and advance the wire intermittently, means mounting said wire advancing mechanism for relative vertical movement, means to feed the wire to said wire advancing mechanism, drive means in engagement with the wire advancing mechanism operable to actuate the same and advance the wire intermittently, a lower electrode on which the members are placed positioned beneath the path of travel of the wire carried by said wire advancing mechanism, an upper electrode above said wires in axial alignment with said lower electrode, a head supporting said upper electrode and mounted for relative vertical movement with respect to said lower electrode between upper and lower limit positions, drive means operable to actuate said head to its lower limit position into engagement with said wire advancing mechanism to force said wire advancing mechanism downwardly and position the wire carried thereby against said members, said drive means actuatable during said downward movement of the head to position said upper electrode in engagement with said members carried by the lower electrode adjacent said wire, adjustable stop means carried by said wire advancing mechanism operable to be engaged by said head when the lowermost edge of the upper electrode engages the wire, a welding circuit, switch means in said circuit operable to be actuated and complete said circuit after said upper electrode engages said members to thereby weld the wire to said members, and control means operable to elevate said head after the welding operation is completed and thereafter actuate the drive means for said wire advancing mechanism to position the next adjacent segment of wire intermediate said upper and lower electrodes.

18. Apparatus for positioning and securing a strand of fine wire between two members comprising; a spindle, means mounting said spindle for vertical movement between upper and lower limit positions, a spider assembly rotatably mounted on said spindle, a plurality of gripping jaws carried by said spider assembly extending radially outward therefrom at regular spaced intervals, said gripping jaws being normally open to receive the strand of wire, means operable to close said jaws after the jaws have received the wire to cause the same to securely grip the wire, a ratchet rotatably mounted on said spindle secured to said spider assembly, a pawl in engagement with said ratchet actuatable between predetermined limit positions, said pawl operable during movement toward one of said limit positions to ratchet over said ratchet and during movement toward the other limit position to engage said ratchet and rotate said spider assembly, a hydraulic cylinder interconnected with said pawl operable to actuate the same between said limit positions, means to feed the wire to the gripping jaws on said spider assembly during rotation thereof, a lower electrode on which the members are placed positioned beneath the path of travel of the wire carried by said jaws, means resiliently mounting said lower electrode, an upper electrode above said wire in axial alignment with said lower electrode, a head supporting said upper electrode and mounted for relative vertical movement with respect to said lower electrode between upper and lower limit positions, drive means operable to actuate said head to its upper and lower limit positions, adjustable stop means cooperatively associated with said spindle engageable by said head during movement toward the lower limit position thereof operable to cause downward movement of the spindle and spider assembly with the head when the lowermost edge of the upper electrode engages said wire, said upper electrode operable upon further downward movement of the head to engage against the members on the lower electrode and force the lower electrode downward against its resilient mounting means to thereby exert a predetermined pressure on said members, a welding circuit, a switch in said circuit operable to be actuated and complete said circuit when said predetermined pressure is exerted on said members to thereby weld the wire to said members, a second electric circuit including the members, the spider, and the wire between said members and spider, second switch means operable to be actuated and complete said second circuit to burn excess wire from said members, said second circuit operable to be completed immediately after the welding operation, and control means operable to actuate said hydraulic cylinder after said welding to rotate the spider and position the next adjacent portion of the wire over the lower electrode.

19. Wire advancing mechanism comprising; a spider assembly, means mounting said spider assembly for catory movement and for vertical movement between predetermined upper and lower limit positions, a plurality of gripping jaws carried by said spider assembly extending radially outward therefrom at regular spaced intervals, said gripping jaws being normally open to receive the strand of wire, means operable to close said jaws after the jars have receive the wire to cause the same to securely grip the wire, drive means to intermittently rotate said spider assembly, and means operable after actuation of said drive means to move said spider assembly vertically between said upper and lower limit positions.

20. Wire advancing mechanism comprising; a spindle, means mounting said spindle for vertical movement between upper and lower limit positions, a spider assembly rotatably mounted on said spindle, a plurality of gripping jaws carried by said spider assembly extending radially outward therefrom at regular spaced intervals, said gripping jaws being normally open to receive the strand of wire, means operable to close said jaws after the jaws have received the wire to cause the same to securely grip the wire, a ratchet rotatably mounted on said spindle secured to said spider assembly, a pawl in engagement with said ratchet actuatable between predetermined limit positions, said pawl operable during movement toward one of said limit positions to ratchet over said ratchet and during movement toward the other limit position to engage said ratchet and rotate said spider assembly, a hydraulic cylinder interconnected with said pawl operable to actuate the same between said limit positions, means to feed the wire to the gripping jaws on said spider assembly during rotation thereof, and means operable after actuation of said hydraulic cylinder to be interconnected with said spindle and move the spindle and spider assembly vertically between said upper and lower limit positions.

21. Wire advancing mechanism comprising; a spindle, means mounting said spindle for vertical movement between upper and lower limit positions, a spider assembly rotatably mounted on said spindle, a plurality of gripping jaws carried by said spider assembly extending radially outward therefrom at regular spaced intervals, said gripping jaws being normally open to receive the strand of wire, means operable to close said jaws after the jaws have received the wire to cause the same to securely grip the wire, a ratchet rotatably mounted on said spindle secured to said spider assembly, a pawl in engagement with said ratchet actuatable between predetermined limit positions, said pawl operable during movement toward one of said limit positions to ratchet over said ratchet and during movement toward the other limit position to engage said ratchet and rotate said spider assembly, a hydraulic cylinder interconnected with said pawl operable to actuate the same between said limit positions, means to feed the wire to the gripping jaws on said spider assembly during rotation thereof, and means operable after actuation of said hydraulic cylinder to engage said spindle and force said spindle and spider assembly downward.

22. In the method of fastening fine wire between two members the steps which comprise; positioning the two members in spaced relation on an electrode, placing the wire across the two members, positioning a second electrode against the opposite side of the two members from the first electrode adjacent the wire, and passing an electric current through the electrodes and members to heat the members to predetermined temperature sufficient to weld said wire thereto.

23. In the method of fastening fine wire between two members the steps which comprise; positioning the two members in spaced relation on an electrode, placing the wire across the two members, positioning a second electrode against the opposite side of the two members from the first electrode adjacent the wire, passing an electric current through the electrodes and members to heat the members to a predetermined temperature sufficient to weld said wire thereto, and then passing a second electric current through the portions of the wire not between the two members to burn the excess wire from said members.

24. In the method of fastening fine wire between two members according to claim 23 comprising passing said second electric current through the wire immediately after the wire is welded to the members and while the wire is still heated by the welding operation to burn the excess wire at a point adjacent the weld.

References Cited in the file of this patent

UNITED STATES PATENTS

| | | |
|---|---|---|
| 738,387 | Withington | Sept. 8, 1903 |
| 1,054,025 | Paulsen | Feb. 25, 1913 |
| 1,639,688 | Duncan | Aug. 23, 1927 |
| 1,685,344 | Stuart | Sept. 25, 1928 |
| 2,024,597 | Pfeiffer | Dec. 17, 1935 |
| 2,260,558 | Caughey | Oct. 28, 1941 |
| 2,331,058 | Stick | Oct. 5, 1943 |
| 2,385,710 | Kershaw | Sept. 25, 1945 |
| 2,662,153 | Gunther | Dec. 8, 1953 |

FOREIGN PATENTS

| | | |
|---|---|---|
| 269,140 | Great Britain | May 3, 1928 |

UNITED STATES PATENT OFFICE
CERTIFICATE OF CORRECTION

Patent No. 2,994,244                                            August 1, 1961

Horace E. Hay

It is hereby certified that error appears in the above numbered patent requiring correction and that the said Letters Patent should read as corrected below.

Column 13, line 44, for "catory" read -- rotary --; line 50, for "jars have receive" read -- jaws have received --.

Signed and sealed this 19th day of June 1962.

(SEAL)
Attest:

ERNEST W. SWIDER
Attesting Officer

DAVID L. LADD
Commissioner of Patents